(12) United States Patent
Morita et al.

(10) Patent No.: US 10,906,255 B2
(45) Date of Patent: Feb. 2, 2021

(54) METHOD FOR PRODUCING MOLDED BODY

(71) Applicant: Toyota Jidosha Kabushiki Kaisha, Toyota (JP)

(72) Inventors: Kenichi Morita, Toyota (JP); Daisei Taguchi, Chiryu (JP); Yusuke Matsumoto, Okazaki (JP); Asahiko Hasebe, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 265 days.

(21) Appl. No.: 15/881,938

(22) Filed: Jan. 29, 2018

(65) Prior Publication Data

US 2018/0243998 A1 Aug. 30, 2018

(30) Foreign Application Priority Data

Feb. 28, 2017 (JP) ................................. 2017-036314

(51) Int. Cl.
*B29C 70/46* (2006.01)
*B29C 70/54* (2006.01)
(Continued)

(52) U.S. Cl.
CPC ......... *B29C 70/467* (2013.01); *B25J 15/0616* (2013.01); *B29C 31/08* (2013.01);
(Continued)

(58) Field of Classification Search
CPC ....... B29C 31/08; B29C 70/38; B29C 70/541; B29C 2043/141; B29C 51/262; B29B 11/12; B29J 15/0616
See application file for complete search history.

(56) References Cited

U.S. PATENT DOCUMENTS 6,345,818 B1 * 2/2002 Stephan ............... B25J 15/0616
271/91
6,495,086 B1 * 12/2002 Uytterhaeghe ....... B29C 70/541
264/322
(Continued)

FOREIGN PATENT DOCUMENTS

DE 10 2006 025 280 A1 12/2006
DE 10 2011 056 029 A1 6/2013
(Continued)

OTHER PUBLICATIONS

Kakimoto WO-2015125854 Machine Translation (Year: 2015).*

*Primary Examiner* — Jacob T Minskey
*Assistant Examiner* — Adrien J Bernard
(74) *Attorney, Agent, or Firm* — Oblon, McClelland, Maier & Neustadt, L.L.P.

(57) ABSTRACT

Provided is a method for producing a molded body that is capable of effectively and accurately producing a molded body from a composite substrate made of a fiber-reinforced resin containing a thermosetting resin and reinforcing fibers. The method includes shaping the composite substrate with the a thermosetting resin in an uncured state into a three-dimensional shape at a site different from where a molding unit is located; conveying the composite substrate to the molding unit so as to maintain the three-dimensional shape thereof; then, placing the conveyed composite substrate on a molding surface of a lower die formed to suit the three-dimensional shape, so as to maintain the three-dimensional shape thereof; and pressing the composite substrate placed on the lower die with an upper die while heated, thereby curing the thermosetting resin and forming the molded body.

5 Claims, 8 Drawing Sheets

(51) Int. Cl.
 *B25J 15/06* (2006.01)
 *B29C 70/38* (2006.01)
 *B29C 31/08* (2006.01)

(52) U.S. Cl.
 CPC .............. *B29C 70/38* (2013.01); *B29C 70/46* (2013.01); *B29C 70/541* (2013.01)

(56) References Cited

U.S. PATENT DOCUMENTS

| | | |
|---|---|---|
| 2005/0029707 A1 | 2/2005 | Kasai et al. |
| 2006/0083806 A1 | 4/2006 | Kasai et al. |
| 2010/0080952 A1 | 4/2010 | Suzuki et al. |
| 2013/0240150 A1 | 9/2013 | Suzuki et al. |
| 2014/0183784 A1 | 7/2014 | Bartel et al. |
| 2015/0298404 A1 | 10/2015 | Kondo et al. |
| 2016/0354983 A1 | 12/2016 | Kakimoto et al. |
| 2017/0050393 A1* | 2/2017 | Duclos .................. B29C 31/085 |

FOREIGN PATENT DOCUMENTS

| | | |
|---|---|---|
| DE | 10 2012 109 671 A1 | 9/2013 |
| JP | 2005-59260 A | 3/2005 |
| JP | 2014-51077 A | 3/2014 |
| JP | 2014-100829 | 6/2014 |
| WO | WO 2008/090911 A1 | 7/2008 |
| WO | WO 2015/125854 A1 | 8/2015 |

* cited by examiner

METHOD FOR PRODUCING MOLDED BODY

CROSS REFERENCE TO RELATED APPLICATIONS

The present application claims priority from Japanese patent application JP 2017-036314 filed on Feb. 28, 2017, the content of which is hereby incorporated by reference into this application.

BACKGROUND

Technical Field

The present disclosure relates to a method for producing a molded body with a three-dimensional shape by press-molding, with a pair of dies, a composite substrate made of a fiber-reinforced resin containing a thermosetting resin and reinforcing fibers.

Background Art

Molded bodies of a fiber-reinforced resin (FRP) containing a thermosetting resin and reinforcing fibers have conventionally been produced. The molded bodies are formed through, for example, press-molding, using a composite substrate (prepreg) obtained by impregnating reinforcing fibers with an uncured thermosetting resin, for example.

As such art, JP 2014-100829 A suggests a method for producing a three-dimensional molded body from a flat composite substrate with an uncured thermosetting resin. In this production method, the flat composite substrate is placed in one of an opened pair of dies, and the pair of dies are then clamped and heated, so that the three-dimensional molded body is produced.

SUMMARY

However, in the method for producing a molded body according to JP 2014-100829 A, prior to press-molding, the flat composite substrate may occasionally be displaced from the desired position with respect to the die. Further, also in the process of deforming the composite substrate with a flat shape into a three-dimensional shape, the composite substrate is likely to be displaced from the die.

Therefore, considering the above, for example, it may be possible to prevent the aforementioned displacement if the composite substrate is made to fit the surface of one of the pair of dies before the composite substrate is press-molded using a pair of dies. However, while the composite substrate is made to fit the surface of the one of the pair of dies, press-molding by means of a press device cannot be performed. This decreases the production efficiency.

The present disclosure has been made in view of the foregoing, and provides a method for producing a molded body that is capable of effectively and accurately producing a molded body from a composite substrate made of a fiber-reinforced resin containing a thermosetting resin and reinforcing fibers.

According to an embodiment of the present disclosure, there is provided a method for producing a molded body by press-molding, with a pair of dies, a composite substrate made of a fiber-reinforced resin containing a thermosetting resin and reinforcing fibers, thereby forming a molded body with a three-dimensional shape, the method including shaping the composite substrate with the thermosetting resin in an uncured state into the three-dimensional shape at a site different from where the pair of dies is located; conveying the shaped composite substrate to the pair of dies so as to maintain the three-dimensional shape thereof; placing the conveyed composite substrate on a molding surface of one of the pair of dies formed to suit the three-dimensional shape, so as to maintain the three-dimensional shape of the composite substrate; and pressing the composite substrate placed on the one of the pair of dies with the other of the pair of dies while heated, thereby curing the thermosetting resin and thus forming the molded body.

According to the present disclosure, the composite substrate can be press-molded such that it is shaped into a three-dimensional shape at a site different from where the pair of dies is located and is then placed on the molding surface of one of the pair of dies so that the three-dimensional shape of the composite substrate that has been shaped is maintained. Therefore, displacement of the composite substrate in press-molding can be suppressed. Further, since the composite substrate is shaped in advance, instead of being directly shaped on the molding surface of the die, a plurality of molded bodies can be consecutively and effectively produced.

In a more preferred aspect, the placing includes, in placing the composite substrate, pressing the conveyed composite substrate with the three-dimensional shape against the molding surface of the one of the pair of dies from a plurality of different directions.

According to this aspect, since the composite substrate is pressed against the molding surface of the one of the pair of dies from the plurality of different directions, the composite substrate tightly adheres to the molding surface of the one of the pair of dies, so that displacement of the composite substrate in the molding can be suppressed.

In a more preferred aspect, in the shaping, the composite substrate in a sheet form is shaped into a three-dimensional shape along the surface of a shaping die such that a main sheet portion and a plurality of sub sheet portions extending from different positions of the main sheet portion in directions different from the extending direction of the main sheet portion are formed, and the conveying includes: a first removing step of removing the sub sheet portions from the shaping die so as to create gaps between the sub sheet portions and the shaping die, with the main sheet portion being in contact with the shaping die; and a second removing step of removing the main sheet portion from the shaping die, with the sub sheet portions removed from the shaping die.

According to this aspect, in the conveying, after the plurality of sub sheet portions extending in directions different from the extending direction of the main sheet portion are removed from the shaping die in the first removing step, the main sheet portion can be removed from the shaping die in the second removing step. Thus, the composite substrate can be removed from the shaping die while the three-dimensional shape of the composite substrate that has been shaped using the shaping die is almost maintained.

Further, in a more preferred aspect of a case in which the conveying includes the first and second removing steps, the placing includes, in placing the composite substrate: a first pressing step of pressing the main sheet portion against the molding surface of the one of the pair of dies after bringing the main sheet portion into contact with the molding surface of the one of the pair of dies; and a second pressing step of pressing the sub sheet portions against the molding surface of the one of the pair of dies with the main sheet portion kept being pressed against the molding surface of the one of the pair of dies. Pressing of the composite substrate from the plurality of different directions against the molding surface of the one of the pair of dies is performed through the first and second pressing steps.

According to this aspect, since the main sheet portion is first positioned with respect to the one of the pair of dies and the sub sheet portions are then pressed against the molding surface of the one of the pair of dies, the composite substrate can be accurately positioned with respect to the molding surface and uniformly and tightly adhere thereto.

Further, in a more preferred aspect of a case in which the placing includes the first pressing step, in the first pressing step, the molding surface of the one of the pair of dies is heated to the curing temperature of the thermosetting resin or higher.

According to this aspect, since in the first pressing step, the molding surface of the one of the pair of dies is heated to the curing temperature of the thermosetting resin or higher, the surface of the main sheet portion pressed against the molding surface can be partially cured. Thus, the composite substrate can be positioned with the main sheet portion kept being pressed against the molding surface of the one of the dies, and displacement of the composite substrate in the subsequent second pressing step and molding step can be suppressed.

According to the present disclosure, the composite substrate can be press-molded such that the composite substrate is shaped into a three-dimensional shape at a site different from where the pair of dies is located and is then placed on one of the dies so that the three-dimensional shape thereof is maintained. Therefore, the molded body can be effectively and accurately produced from the composite substrate.

DETAILED DESCRIPTION

An embodiment of a method for producing a molded body according to the present disclosure will be described below with reference to FIG. 1 to FIG. 9.

1. Regarding Molded Body Production Apparatus 1

Figure 1:
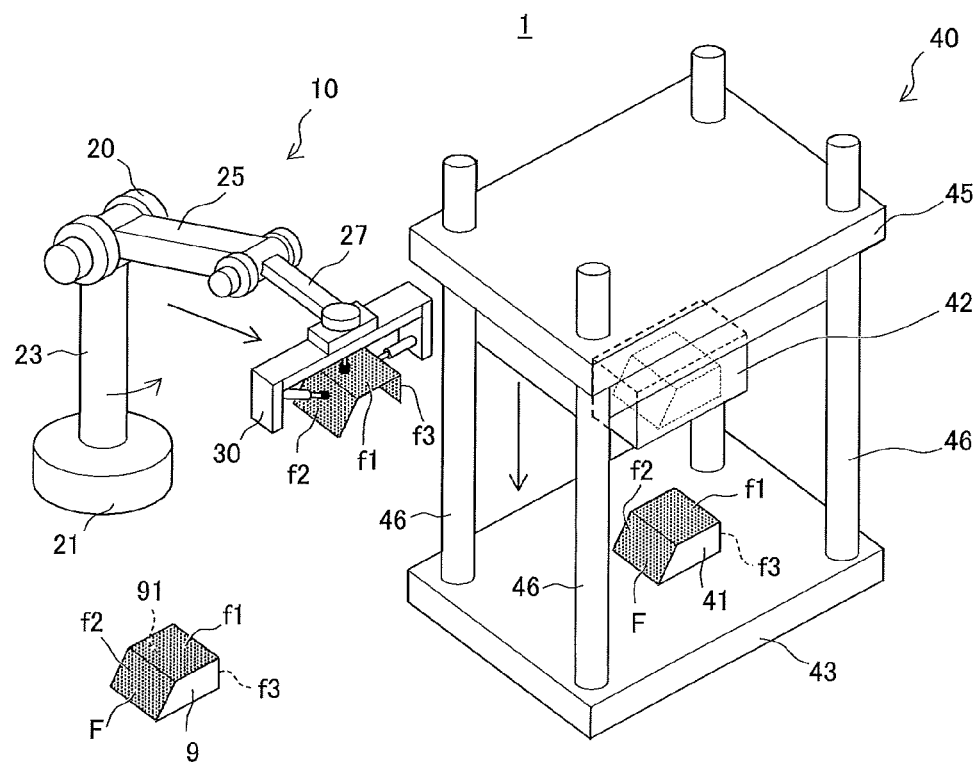
FIG. 1 is a schematic perspective view of a production apparatus adapted to perform a method for producing a molded body according to an embodiment of the present disclosure.
Figure 2:
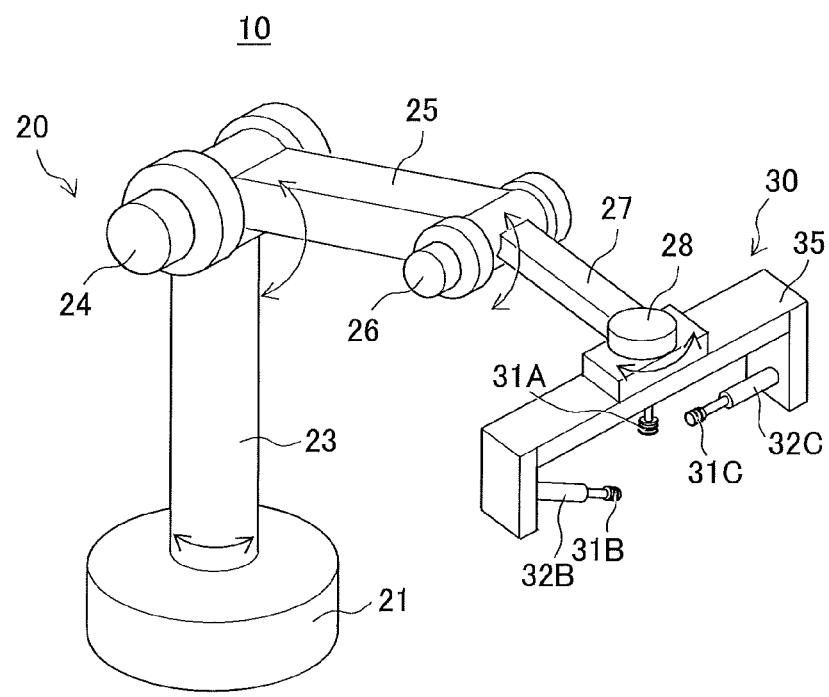
FIG. 2 is a schematic perspective view of a conveyer shown in FIG. 1.
Figure 3:
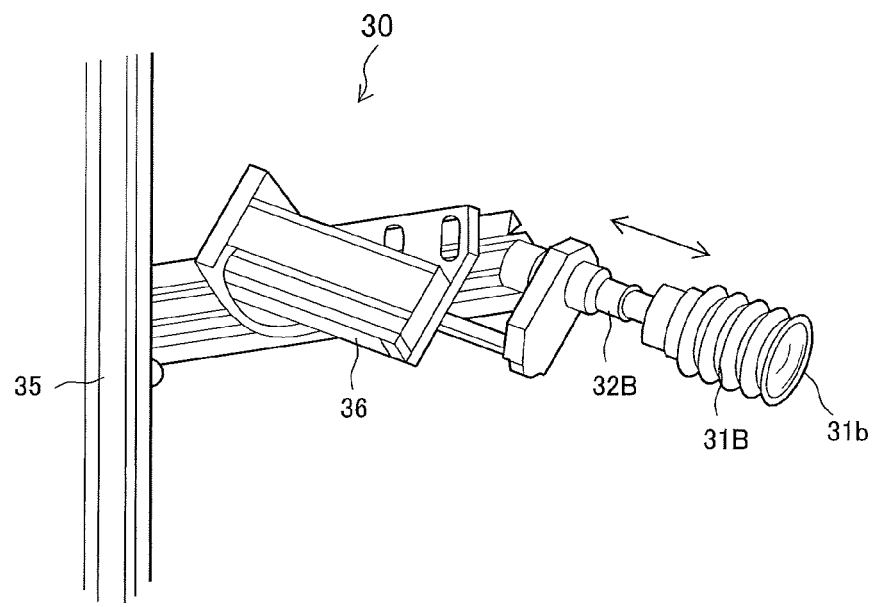
FIG. 3 is a perspective view of the main part of a suction mechanism shown in FIG. 2.
Figure 4:
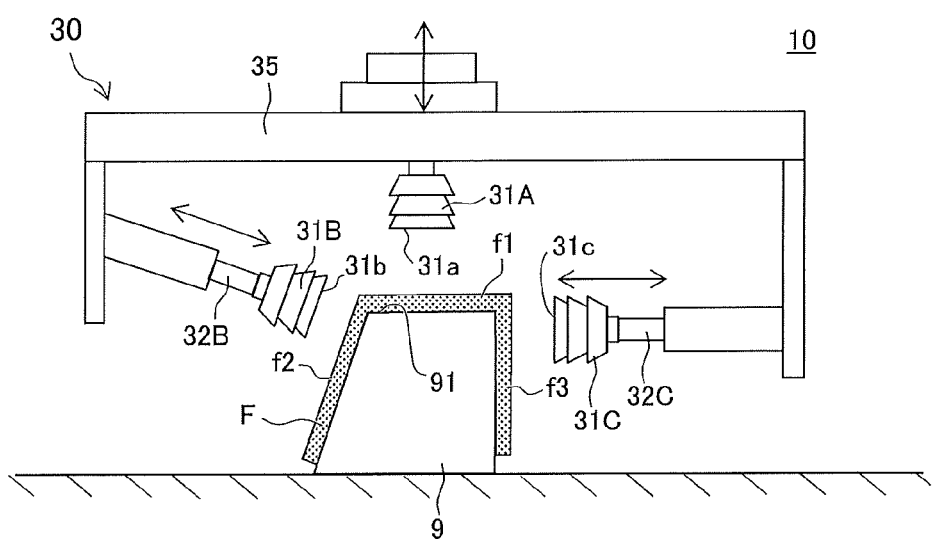
FIG. 4 is a front view of a shaping die and the main part of the conveyer shown in FIG. 1.

First, a production apparatus 1 for producing a molded body will be described. FIG. 1 is a schematic perspective view of a production apparatus 1 adapted to perform a method for producing a molded body according to an embodiment of the present disclosure; FIG. 2 is a schematic perspective view of a conveyer 10 shown in FIG. 1; FIG. 3 is a perspective view of the main part of a suction mechanism 30 shown in FIG. 2; and FIG. 4 is a front view of a shaping die 9 and the main part of the conveyer 10 shown in FIG. 1.

1-1. Regarding Shaping Die 9

As shown in FIG. 1, in the present embodiment, the production apparatus 1 includes at least the shaping die (shaping bench) 9, the conveyer 10, and a molding unit 40. The shaping die 9 is a die for shaping a composite substrate (prepreg) made of a fiber-reinforced resin containing an uncured thermosetting resin and reinforcing fibers into a predetermined three-dimensional shape.

Specifically, the shaping die 9 is adapted to shape a composite substrate F into a three-dimensional shape along the surfaces of the shaping die 9. Of the surfaces of the shaping die 9, a shaping surface 91 where the composite substrate F is to contact has the same shape as that of a molding surface 41a of a lower die (male die) 41 of the molding unit 40 that will be described later.

It should be noted that as in the later description of shaping step S1, the shaped composite substrate F is a shaped body in a sheet form that has a top surface portion (main sheet portion) f1 and two side surface portions (sub sheet portions) f2 and f3 formed thereon. The side surface portions (sub sheet portions) f2 and f3 extend from different positions of the top surface portion f1 in directions different from the extending direction of the top surface portion f1. It should be noted that in the present embodiment, the shaped composite substrate F includes two side surface portions f2 and f3, but the number of the side surface portions may be determined in accordance with the shape of the molded body to be formed.

The shaping surface 91 of the shaping die 9 where the composite substrate F is to contact may have a plurality of grooves formed thereon, and the shaping surface may be coated with resin such as PTFE that is highly releasable from the composite substrate F. With the plurality of grooves formed and resin coating, the composite substrate F can be easily removed from the shaping die 9.

1-2. Regarding Conveyer 10

The conveyer 10 is a device (articulated robot) that is adapted to remove, from the shaping die 9, the composite substrate F that has been shaped with an uncured thermosetting resin and reinforcing fibers and convey it to the molding unit 40. Specifically, the conveyer 10 conveys the composite substrate F to the lower die 41 of the molding unit 40 so as to maintain the three-dimensional shape of the composite substrate F that has been shaped using the shaping die 9. It should be noted that in FIG. 1, for the convenience of illustration, the conveyer 10 and the molding unit 40 are shown to be away from each other, but they are actually close enough to allow an arm-like transfer mechanism 20 of the conveyer 10 that will be described later to place the composite substrate F in the lower die 41 of the molding unit 40.

As shown in FIG. 2, the conveyer 10 includes the arm-like transfer mechanism 20 that transfers the composite substrate F, and a suction mechanism 30 that is attached to the transfer mechanism 20 and is adapted to suck the composite substrate F. The arm-like transfer mechanism 20 includes a support post 23 that stands on a base 21 and is horizontally rotatable when driven by a drive motor (not shown). One end of a first arm portion 25 is rotatably connected to the tip end of the support post 23 and a second arm portion 27 is rotatably connected to the other end of the first arm portion 25.

The first arm portion 25 is configured to vertically swing with respect to the support post 23 when driven by a drive motor 24 attached to the support post 23. Further, the second arm portion 27 is configured to vertically swing with respect to the support post 23 when driven by a drive motor 26 attached to the other end (tip end) of the first arm portion 25. A tip end of the second arm portion 27 has attached thereto the suction mechanism 30 that is configured to rotate when driven by a drive motor 28.

The suction mechanism 30 includes first to third suction portions 31A to 31C that suck the composite substrate F by contacting the composite substrate F from three different directions. The first suction portion 31A is attached to a frame 35 such that a suction surface 31a thereof faces the top surface portion (main sheet portion) f1 of the composite substrate F. In the present embodiment, the first suction portion 31A is not moved by means of a moving portion that will be described later, but moves together with the composite substrate F when the suction mechanism 30 is vertically moved by means of the transfer mechanism 20 (specifically, when the first arm portion 25 and second arm portion 27 swing). Therefore, the first suction portion 31A does not relatively move with respect to the frame 35, but is secured thereto.

The second and third suction portions 31B and 31C have attached thereto first and second moving portions 32B and 32C, respectively. The first and second moving portions 32B and 32C move the second and third suction portions 31B and 31C, respectively, so that the second and third suction portions 31B and 31C contact the composite substrate F from two different directions. It should be noted that in the present embodiment, three suction portions of the first to third suction portions 31A to 31C and two moving portions of the first and second moving portions 32B and 32C are provided, but as long as the composite substrate F can be sucked from a plurality of directions and conveyed, the numbers of the suction and moving portions are not particularly limited.

As shown in FIG. 3 and FIG. 4, the second suction portion 31B is attached to the tip end of the first moving portion 32B, and the first moving portion 32B is attached to the frame 35 via an attachment 36 for angle adjustment. Similarly, the third suction portion 31C is attached to the tip end of the second moving portion 32C, and the second moving portion 32C is attached to the frame 35 via an attachment (not shown) for angle adjustment.

Herein, each of the first to third suction portions 31A to 31C is a cylindrical (specifically, bellows-like) suction body (see, for example, FIG. 3) with an open tip end to be brought into contact with the composite substrate F. The first to third suction portions 31A to 31C can suck the composite substrate F by making the pressure inside the suction bodies negative using, for example, a suction pump, with the suction surfaces 31a to 31c kept being in contact with the composite substrate F.

As shown in FIG. 4, the second suction portion 31B is attached to the frame 35 via the first moving portion 32B or the like so that the suction surface 31b thereof faces the side surface portion f2 of the composite substrate F. The third suction portion 31C is attached to the frame 35 via the second moving portion 32C or the like so that the suction surface 31c thereof faces the side surface portion f3 of the composite substrate F. Herein, the side surface portion f3 of the composite substrate F is a surface that is formed on the opposite side of the side surface portion f2 via the top surface portion f1, and the side surface portions f2 and f3 are different side surface portions of the composite substrate F.

In the present embodiment, the composite substrate F that has been shaped into the three-dimensional shape using the shaping die 9 can be conveyed while sandwiched by the second suction portion 31B and the third suction portion 31C disposed on the side opposite thereto of the composite substrate F.

In the present embodiment, the first moving portion 32B and second moving portion 32C are direct-acting actuators. As shown in FIG. 4, the first moving portion 32B is disposed so as to move the second suction portion 31B along a direction orthogonal to the side surface portion f2 of the composite substrate F. Similarly, the second moving portion 32C is disposed so as to move the third suction portion 31C along a direction orthogonal to the side surface portion f3 of the composite substrate F. The first and second moving portions 32B and 32C configured in the aforementioned manner move the second and third suction portions 31B and 31C, respectively, thereby bringing the suction surfaces 31b and 31c into uniform contact with the side surface portions f2 and f3 of the composite substrate F, respectively.

1-3. Regarding Molding Unit 40

As shown in FIG. 1, the molding unit 40 is a device that performs press-molding of the composite substrate F that has been conveyed and placed by means of the conveyer 10. The molding unit 40 includes the lower die 41 (male die) as one of the pair of dies on which the composite substrate F is placed and an upper die (female die) 42 as the other of the pair of dies that presses the composite substrate F placed on the lower die 41. It is preferable that the lower die 41 and upper die 42 form a pair of dies made of metal.

The lower die 41 is disposed on a base 43 and the upper die 42 is attached to a press portion 45 that vertically moves along support posts 46 that stand on the base 43. The base 43 and press portion 45 each have a heater (not shown) incorporated therein, and with the heaters, the lower die 41 and upper die 42 can be heated to the curing temperature of the thermosetting resin contained in the composite substrate F or higher.

2. Regarding Molded Body Producing Method

Figure 5:
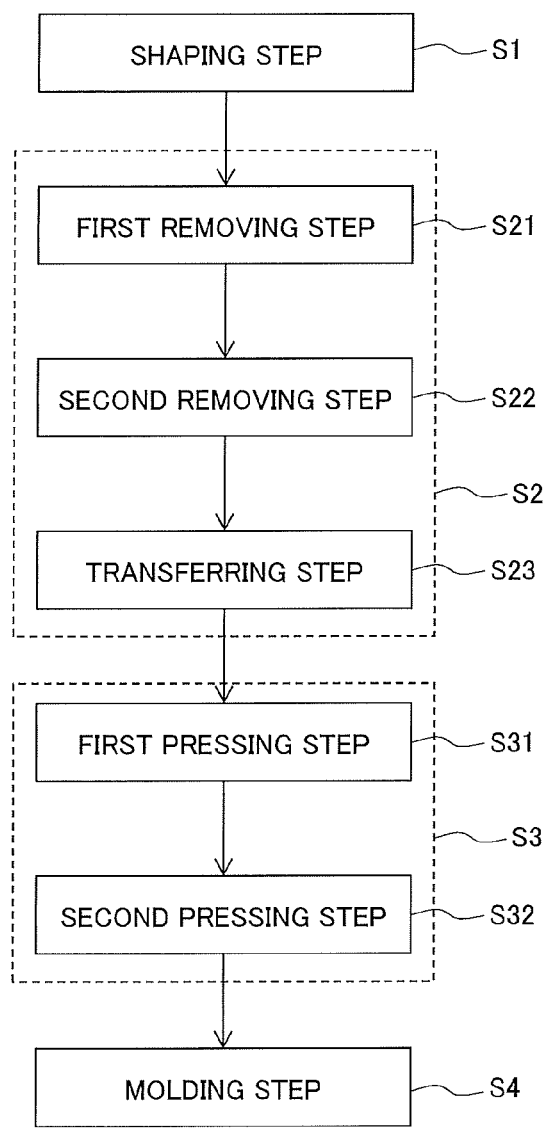
FIG. 5 shows a flow of a method for producing a molded body according to an embodiment of the present disclosure.

The method for producing a molded body will be described below with reference to FIG. 5. FIG. 5 shows a flow of the method for producing a molded body according to an embodiment of the present disclosure.

First, a composite substrate in a sheet form to be shaped into a three dimensional shape is prepared. As described above, the composite substrate is a sheet of a fiber-reinforced resin obtained by impregnating reinforcing fibers with an uncured thermosetting resin. The reinforcing fibers are fibers for reinforcing the thermosetting resin to reinforce the mechanical strength of the composite substrate, and examples of the reinforcing fibers include glass fibers, carbon fibers, alamido fibers, alumina fibers, boron fibers, steel fibers, PBO fibers, and high-strength polyethylene fibers. The reinforcing fibers may be formed of a textile substrate of plain weave, twill weave, or sateen weave or a substrate in which fibers are oriented in a single direction. Examples of the thermosetting resin include vinyl ester resin, epoxy resin, fiber-reinforced resin, and unsaturated polyester resin.

2-1. Regarding Shaping Step S1

In the present embodiment, shaping step S1 shown in FIG. 5 is first performed. In shaping step S1, using the shaping die 9 that is located at a site different from where the molding unit 40 is located, the composite substrate in a sheet form with the thermosetting resin in an uncured state is shaped into a three-dimensional shape.

Figure 6:
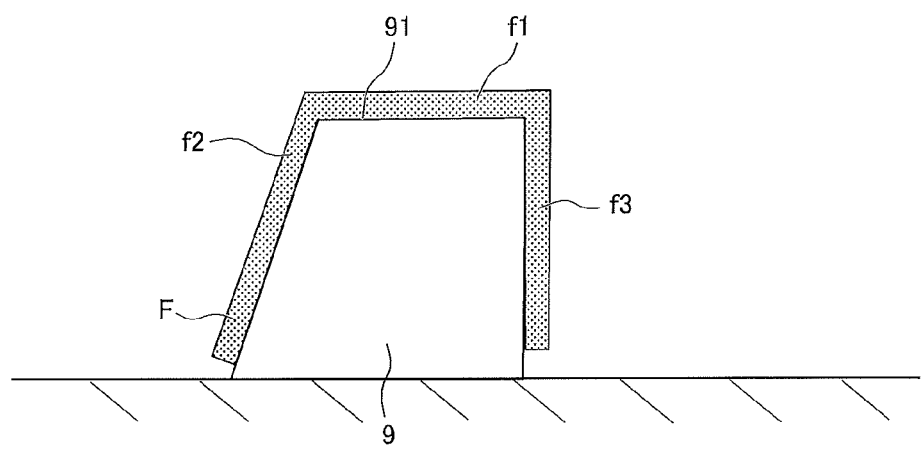
FIG. 6 is a schematic view for illustration of a shaping step shown in FIG. 5.

Specifically, as shown in FIG. 6, in shaping step S1, the composite substrate F is shaped into a three-dimensional shape along the shaping surface 91 of the shaping die 9 so that the top surface portion (main sheet portion) f1 and two side surface portions (sub sheet portions) f2 and f3 are formed. The side surface portions f2 and f3 extend from different positions of the top surface portion f1 in directions (specifically, downward) different from the extending direction of the top surface portion f1.

Of the surfaces of the shaping die 9, the shaping surface 91 where the composite substrate F is to contact has the same shape as that of the molding surface 41a of the lower die (male die) 41 of the molding unit 40 that will be described later, and therefore, the shaped composite substrate F has the same three-dimensional shape as that of a molded body to be produced.

It should be noted that in the present embodiment, in shaping step S1, the top surface portion f1 as the main sheet portion and the side surface portions f2 and f3 as the plurality of sub sheet portions that extend from different positions of the top surface portion f1 in directions (specifically, downward) different from the extending direction of the top surface portion f1 are formed to form the composite substrate F with the three-dimensional shape. However, the composite substrate may be formed such that the lower surface portion is formed as the main sheet portion and two side surface portions are formed as the sub sheet portions so as to extend in (upward) directions different from the extending direction of the main sheet portion. Further, the number of the side surface portions is not particularly limited as long as it is more than one.

2-2. Regarding Conveying Step S2

Next, conveying step S2 shown in FIG. 5 is performed using the conveyer 10. In conveying step S2, the composite substrate F is conveyed to the space between the upper die 42 and the lower die 41 so as to maintain the three-dimensional shape of the composite substrate F that has been shaped. In the present embodiment, conveying step S2 includes first removing step S21, second removing step S22, and transferring step S23. Prior to first removing step S21, the suction mechanism 30 is caused to suck the composite substrate F, as shown in FIG. 7A.

Figure 7A:
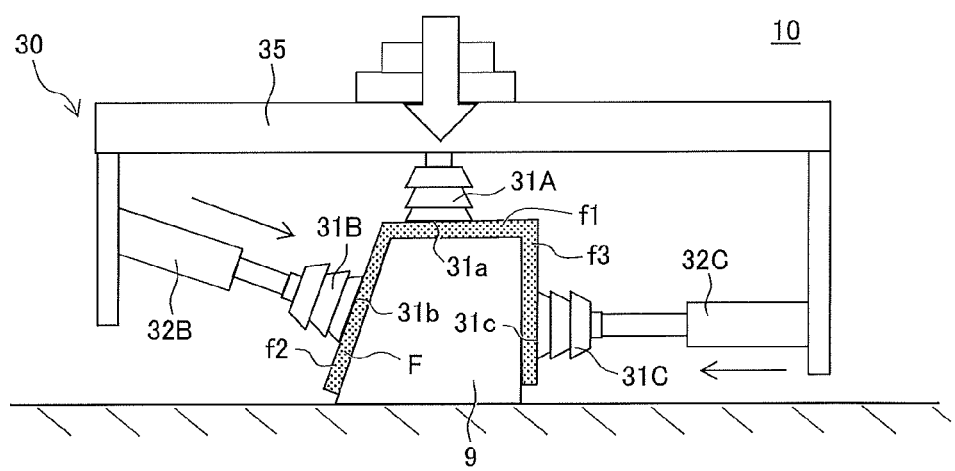
FIG. 7A is a schematic view for illustration of suction of a composite substrate in a conveying step shown in FIG. 5.

Specifically, as shown in FIG. 7A, the transfer mechanism 20 of the conveyer 10 moves the suction mechanism 30 to the site where the composite substrate F is placed. Through swinging the first arm portion 25 and second arm portion 27, the suction surface 31a of the first suction portion 31A is brought into contact with the top surface portion f1 of the composite substrate F.

Then, with the suction surface 31a of the first suction portion 31A kept being in contact with the top surface portion f1 of the composite substrate F, the first and second moving portions 32B and 32C move the second and third suction portions 31B and 31C, respectively, thereby bringing the second and third suction portions 31B and 31C into contact with the side surface portions f2 and f3 of the composite substrate F, respectively.

With this state, a suction pump (not shown) is driven, so that the first suction portion 31A, the second suction portion 31B, and the third suction portion 31C are caused to suck the top surface portion f1, the side surface portion f2, and the side surface portion f3 of the composite substrate F, respectively.

Figure 7B:
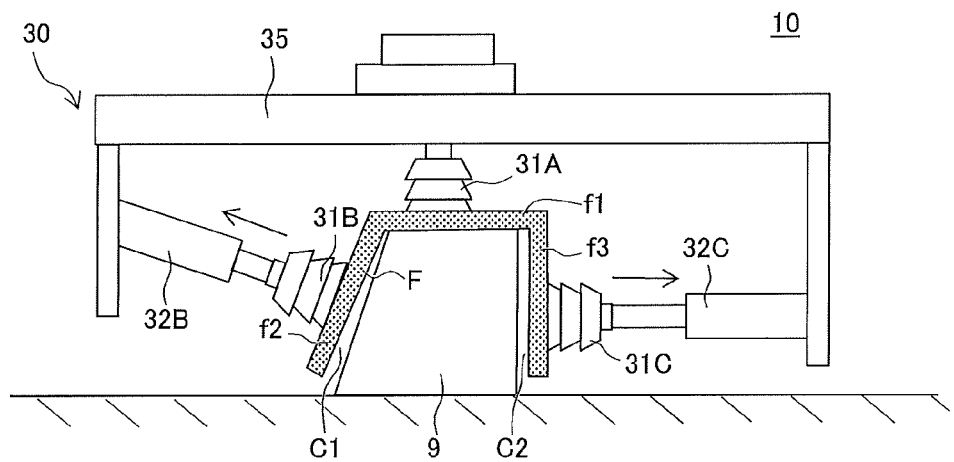
FIG. 7B is a schematic view for illustration of a first removing step of the conveying step shown in FIG. 5.

Then, as first removing step S21, as shown in FIG. 7B, with the top surface portion f1 kept being in contact with the shaping surface 91 of the shaping die 9, the side surface portions f2 and f3 are removed from the shaping surface 91 of the shaping die 9 so that small gaps C1 and C2 are created between the side surface portions f2 and f3 and the shaping die 9. It should be noted that the gaps C1 and C2 are gaps that allow the three-dimensional shape of the composite substrate F to be apparently maintained.

Specifically, while the side surface portions f2 and f3 of the composite substrate F are being sucked by the second suction portion 31B and the third suction portion 31C, respectively, the second and third suction portions 31B and 31C are moved by means of the first and second moving portions 32B and 32C, respectively, in directions in which the second and third suction portions 31B and 31C move away from the shaping die 9. In this manner, the side surface portions f2 and f3 can be removed from the shaping surface 91 in directions orthogonal to the side surface portions f2 and f3.

Figure 7C:
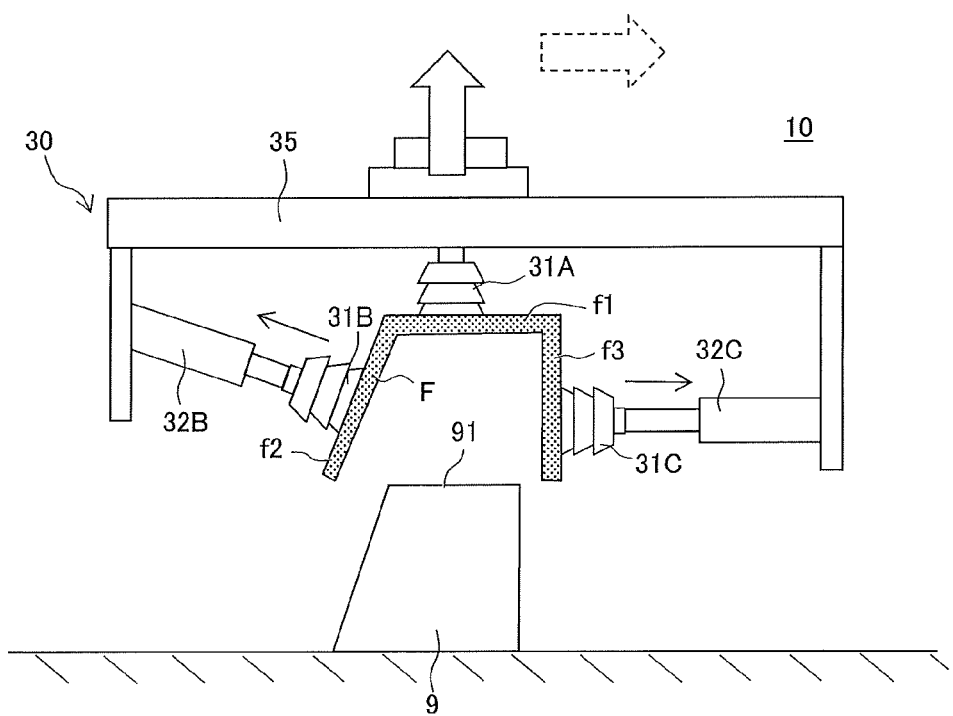
FIG. 7C is a schematic view for illustration of a second removing step of the conveying step shown in FIG. 5.

Then, as second removing step S22, as shown in FIG. 7C, with the side surface portions f2 and f3 removed from the shaping die 9, the top surface portion f1 is removed from the shaping surface 91 of the shaping die 9. Specifically, with the composite substrate F kept being sucked by the first to third suction portions 31A to 31C, the first arm portion 25 and second arm portion 27 of the transfer mechanism 20 are swung to move the suction mechanism 30 upward, so that the composite substrate F is removed from the shaping die 9.

In the present embodiment, in conveying step S2, after the side surface portions f2 and f3 that extend in directions different from the extending direction of the top surface portion f1 are removed from the shaping die 9 in first removing step S21, the top surface portion f1 as the center portion of the composite substrate F can be removed from the shaping die 9 in second removing step S22. Therefore, the composite substrate F can be easily removed from the shaping die 9 while the three-dimensional shape of the composite substrate F that has been shaped using the shaping die 9 is almost maintained.

Figure 7D:
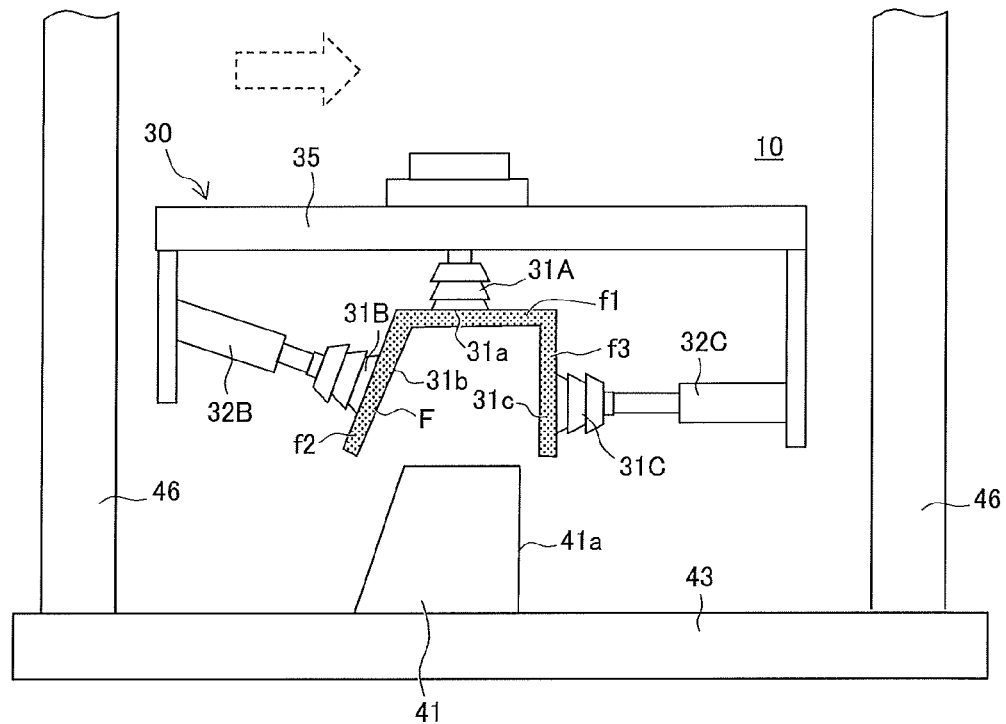
FIG. 7D is a schematic view for illustration of a transferring step of the conveying step shown in FIG. 5.

Then, as transferring step S23, as shown in FIG. 7D, the composite substrate F is conveyed to the molding unit 40 by means of the conveyer 10 so as to maintain the three-dimensional shape of the composite substrate F that has been shaped. In the present embodiment, the composite substrate F that has been shaped into the three-dimensional shape is conveyed while being sucked by the first to third suction portions 31A to 31C from three directions. The composite substrate F can consequently be conveyed to the molding unit 40 so as to maintain the three-dimensional shape thereof.

2-3. Regarding Placing Step S3

Next, placing step S3 shown in FIG. 5 is performed using the conveyer 10. In placing step S3, the composite substrate F that has been conveyed is placed on the molding surface 41a of the lower die 41 that has been formed to suit the three-dimensional shape of the composite substrate F so as to maintain the three-dimensional shape. In the present embodiment, conveying step S2 includes first pressing step S31 and second pressing step S32. Specifically, in first and second pressing steps S31 and S32, in placing the composite substrate F, the three-dimensional composite substrate F that has been conveyed is pressed against the molding surface 41a of the lower die 41 from three different directions.

Figure 8A:
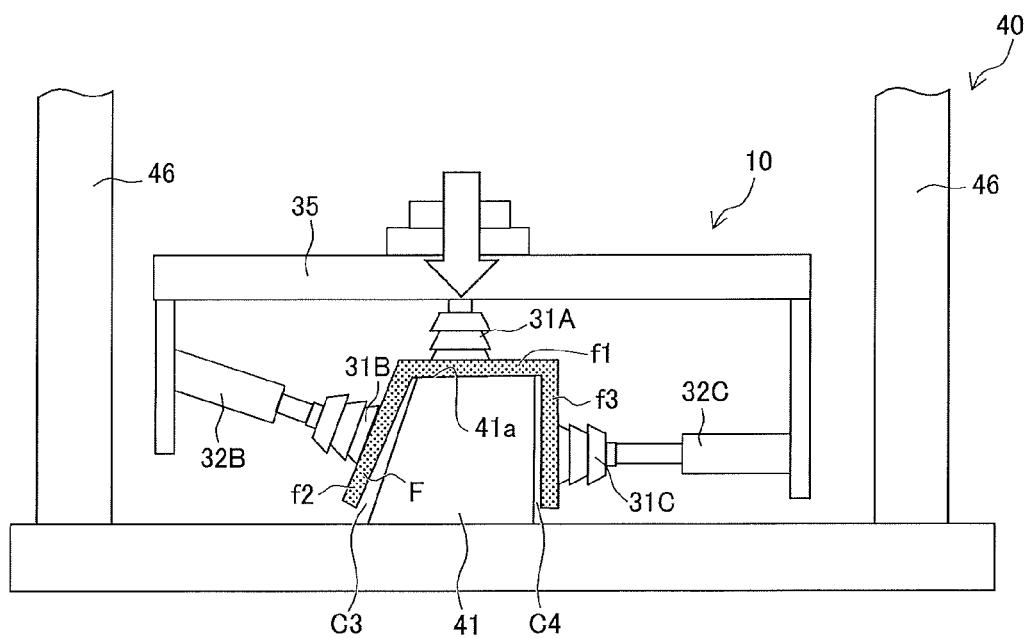
FIG. 8A is a schematic view for illustration of a first pressing step of a placing step shown in FIG. 5.

In first pressing step S31, as shown in FIG. 8A, in placing the composite substrate F, the top surface portion f1 is brought into contact with and is then pressed against the molding surface 41a of the lower die 41. Specifically, with the composite substrate F kept being sucked by the first to third suction portions 31A to 31C, the first arm portion 25 and second arm portion 27 of the transfer mechanism 20 are swung to move the suction mechanism 30 downward. In this state, small gaps C3 and C4 are created between the side surface portions f2 and f3 and the shaping die 9. The gaps C3 and C4 correspond to the gaps C1 and C2 that have been created in first removing step S21 shown in FIG. 7B. It should be noted that in the present embodiment, the upper die 42 and the lower die 41 are heated to the curing temperature of the thermosetting resin or higher in first pressing step S31, but they may be heated in molding step S4 that will be described later.

Figure 8B:
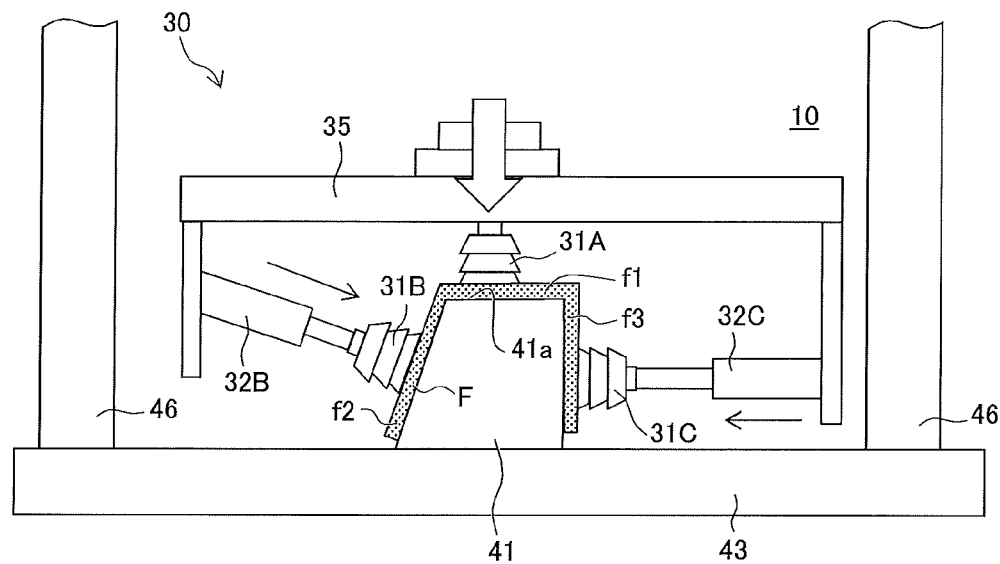
FIG. 8B is a schematic view for illustration of a second pressing step of the placing step shown in FIG. 5.

Next, in second pressing step S32, as shown in FIG. 8B, with the top surface portion f1 kept being pressed against the molding surface 41a of the lower die 41, the side surface portions f2 and f3 are pressed against the molding surface 41a of the lower die 41. Specifically, suction by the first to third suction portions 31A to 31C is released, and by means of the first and second moving portions 32B and 32C, the second and third suction portions 31B and 31C are moved toward the molding surface 41a of the lower die 41.

In this manner, the top surface portion f1 as the center of the composite substrate F is pressed against and thus positioned with respect to the molding surface 41a of the lower die 41, and then the side surface portions f2 and f3 can be pressed against the molding surface 41a of the lower die 41, thereby allowing the composite substrate F to be accurately positioned with respect to the molding surface 41a of the lower die 41 and formation of creases and the like on the side surface portions f2 and f3 to be suppressed, so that the surface portions can uniformly and tightly adhere to the molding surface 41a of the lower die 41.

It should be noted that in the present embodiment, in first pressing step S31, since the molding surface 41a of the lower die 41 is heated to the curing temperature of the thermosetting resin contained in the composite substrate F or higher, the surface of the top surface portion f1 pressed against the molding surface can be cured. Thus, the composite substrate F can be positioned with the top surface portion f1 kept being pressed against the molding surface 41a of the lower die 41, and displacement of the composite substrate F with respect to the upper die 42 and lower die 41 can be suppressed in subsequent second pressing step S32 and molding step S4.

2-4. Regarding Molding Step S4

Figure 9:
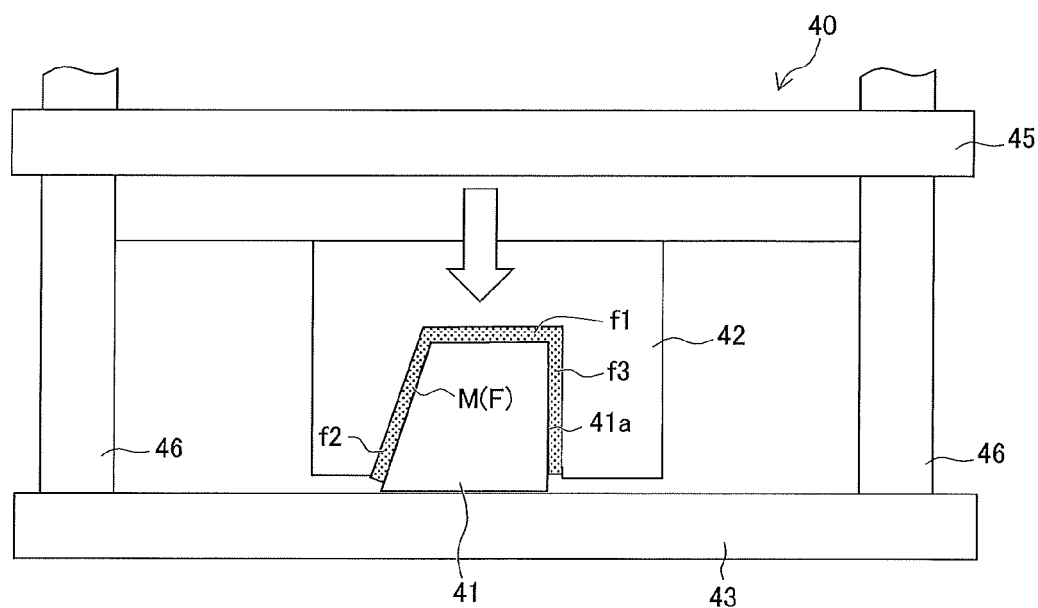
FIG. 9 is a schematic view for illustration of a molding step shown in FIG. 5.

Next, molding step S4 shown in FIG. 5 is performed using the molding unit 40. Specifically, in molding step S4, as shown in FIG. 9, the upper die 42 and the lower die 41 are clamped, so that the composite substrate F placed on the lower die 41 is pressed (press-molded) with the upper die 42 while heated. In this manner, the thermosetting resin contained in the composite substrate F is cured to form a molded body M. Then, the dies are opened to take out the molded body M from the molding unit 40 using the conveyer 10.

In the aforementioned manner, according to the present embodiment, the composite substrate F can be press-molded such that it is shaped into a three-dimensional shape at a site different from where the molding unit 40 is located and is then placed on the molding surface 41a of the lower die 41 so that the three-dimensional shape of the composite substrate that has been shaped is maintained. Therefore, displacement of the composite substrate F between the upper die 42 and the lower die 41 in press-molding can be suppressed. Further, since the composite substrate F is shaped by the shaping die 9 in advance instead of being directly shaped on the molding surface 41a of the lower die 41, the operation rate of the molding unit 40 can be increased and a plurality of molded bodies M can be consecutively and effectively formed.

Although the embodiment of the present disclosure has been described in detail, specific structures are not limited to those of the embodiment and example, and any design changes that may occur within the spirit and scope of the present disclosure are all included in the present disclosure.

In the present embodiment, the second removing step is performed after the first removing step, but for example, if the composite substrate can be removed from the shaping die only through the second removing step, the first removing step may be omitted. Further, if the composite substrate tightly adheres to the lower die with the composite substrate simply being in contact with the molding surface of the lower die, it goes without saying that the composite substrate need not be pressed against the molding surface of the lower die.

DESCRIPTION OF SYMBOLS

9 Shaping die
10 Conveyer
40 Molding unit
41 Lower die (one of dies)
41a Molding surface
42 Upper die (the other of dies)
C1, C2 Gap
F Composite substrate
f1 Top surface portion (main sheet portion)
f2 Side surface portion (sub sheet portion)
M Molded body

What is claimed is:

1. A method for producing a molded body by press-molding, with a pair of dies, a composite substrate made of a fiber-reinforced resin containing a thermosetting resin and reinforcing fibers, thereby forming a molded body with a three-dimensional shape, the method comprising:

shaping the composite substrate with the thermosetting resin in an uncured state into the three-dimensional shape at a site different from where the pair of dies is located, the composite substrate being in a sheet form and being shaped into the three-dimensional shape along a surface of a shaping die such that a main sheet portion and a plurality of sub sheet portions extending from different positions of the main sheet portion in directions different from an extending direction of the main sheet portion are formed;

conveying the shaped composite substrate to the pair of dies using a suction mechanism so as to maintain the three-dimensional shape thereof, the suction mechanism including a main sheet suction portion, sub sheet suction portions, and sub sheet moving portions which move the sub sheet suction portions, the conveying including a first removing step of removing the sub sheet portions from the sub sheet portions of the shaping die using the sub sheet suction portions and respectively moving the sub sheet suction portions by the sub sheet moving portions along a direction orthogonal to the sub sheet portions so as to create gaps between the sub sheet portions and the shaping die, with the main sheet portion in contact with the shaping die; and a second removing step of removing the main sheet portion from the shaping die using the main sheet suction portion, with the sub sheet portions removed from the shaping die, the main sheet suction portion being different from the sub sheet suction portions;

placing the conveyed composite substrate on a molding surface of one of the pair of dies formed to suit the three-dimensional shape, so as to maintain the three-dimensional shape of the composite substrate, the placing including pressing the conveyed composite substrate with the three-dimensional shape against the molding surface of the one of the pair of dies from a plurality of different directions; and pressing the composite substrate placed on the one of the pair of dies with another of the pair of dies while heated, thereby curing the thermosetting resin and thus forming the molded body.

2. The method for producing a molded body according to claim 1, wherein the placing includes:

a first placing step of bringing the main sheet portion into contact with the molding surface of the one of the pair of dies and then pressing the main sheet portion against the molding surface of the one of the pair of dies in placing the composite substrate; and a second placing step of pressing the sub sheet portions against the molding surface of the one of the pair of dies, with the main sheet portion kept being pressed against the molding surface of the one of the pair of dies, and pressing of the composite substrate against the molding surface of the one of the pair of dies from the plurality of different directions is performed through the first and the second pressing steps.

3. The method for producing a molded body according to claim 2, wherein in the first placing step, the molding surface of the one of the pair of dies is heated to a curing temperature of the thermosetting resin or higher.

4. The method for producing a molded body according to claim 2, wherein in the first placing step, the sub sheet portions are spaced apart from the molding surface of the one of the pair of dies at a distance corresponding to the gaps created during the first removing step.

5. The method for producing a molded body according to claim 1, wherein the sub sheet suction portions are attached to tips ends of the sub sheet moving portions, the sub sheet moving portions are attached to a frame via an attachment for angle adjustment, and the main sheet suction portion is attached to the frame such that the main sheet suction portion does not relatively move with respect to the frame.

* * * * *